United States Patent Office 2,861,919
Patented Nov. 25, 1958

2,861,919
FUNGICIDE COMPRISING MUCOCHLORIC ANHYDRIDE

Everett E. Gilbert, Morris Township, Morris County, N. J., assignor to Allied Chemical Corporation, a corporation of New York No Drawing. Application November 13, 1956
Serial No. 621,533

5 Claims. (Cl. 167—33)

This invention relates to a new fungicide of exceptionally high activity and to a method for preventing and retarding fungus growth on organic material in which such fungicide is employed.

The new fungicide of the present invention is bis-(3,4-dichloro-2(5)-furanonyl) ether. This material which is known as mucochloric anhydride has the following structure:

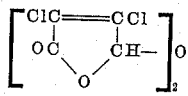

Mucochloric anhydride is a stable, crystalline solid substantially insoluble in water but soluble in many organic solvents. These advantageous properties of mucochloric anhydride together with its excellent fungicidal effectiveness combine to provide an extremely valuable fungicide.

Mucochloric anhydride may be prepared by heating mucochloric acid with an organic solvent in the presence of a mineral acid catalyst in accordance with the following equation:

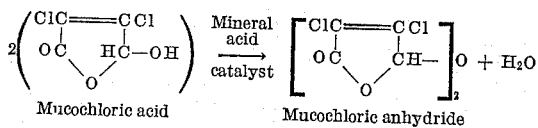

A specific procedure for preparing mucochloric anhydride is described in Journal of American Chemical Society, volume 72, page 2537 (1950).

Mucochloric anhydride has excellent general utility as a fungicide. More specifically, it is highly efficient for preventing and retarding fungus growth on organic material. It may be applied directly to the material to be treated, but, since very small dosages are effective, it is preferably incorporated with a carrier.

Fungicidal dust formulations may be prepared by intimately mixing the anhydride with materials such as talc, clay, fuller's earth, etc.

Spray formulations may be prepared by dissolving the anhydride in a suitable organic solvent such as acetone, xlyene, methylated naphthalenes or cyclohexanone. Dispersions of the anhydride, also suitable as sprays, may be prepared either by dispersing the anhydride in water or by dissolving the anhydride in a solvent such as acetone and dispersing the resultant solution in water.

The concentration of the mucochloric anhydride used in the above-described formulations is dependent upon the particular purpose for which it is intended. In general, I have found that a concentration of mucochloric anhydride ranging from about 0.5 to 90% of the weight of the carrier is useful, although, generally speaking, I prefer to use an amount ranging from about 5 to 50%.

The outstanding fungicidal properties of mucochloric anhydride are illustrated in the following examples.

*Example 1.*—1% acetone solutions of mucochloric anhydride, diluted with varying quantities of water, were tested in standard spore germination tests against spores of *Sclerotinia fructicola* (brown rot of stone fruits). Sclerotinia spores were produced by growing the fungus on potato dextrose agar plants for one week. Complete control (no germination) of the spores was obtained at as low a dosage of mucochloric anhydride as 1 part per million parts of solution.

*Example 2.*—1% acetone solutions of mucochloric anhydride, diluted with varying quantities of water, were tested in standard spore germination tests against spores of *Stemphylium sarcinaeforme* (target spot of clover). Stemphylium spores were produced by growing the fungus on oatmeal agar plants for two weeks. Complete control (no germination) of the spores was obtained at a dosage of mucochloric anhydride of 100 parts per million parts of solution.

*Example 3.*—A 1% acetone solution of mucochloric anhydride was diluted nine times its volume with water. The resultant solution was sprayed on the foliage of apple plants. The plants were then inoculated with *Venturia inaequalis* (apple scab). Complete control of the apple scab resulted with no apparent injury to the apple plants.

*Example 4.*—A 1% acetone solution of mucochloric anhydride was diluted nine times its volume with water and was sprayed on the foliage of tomato plants. The plants were then inoculated with *Phytophthora infestans* (tomato late blight). The application of the mucochloric anhydride resulted in excellent control of the late blight, and average defoliation of the plants was only about 1%.

Since various changes and modifications may be made in the invention without departing from the spirit thereof, the invention is deemed to be limited only by the scope of the appended claims.

I claim:

1. The method of preventing and retarding fungus growth on organic material which comprises treating said organic material with mucochloric anhydride.

2. The method of preventing and retarding fungus growth on organic material which comprises treating said organic material with mucochloric anhydride in a carrier.

3. The method of controlling fungi which comprises treating plants subject to attack by fungi with a composition comprising mucochloric anhydride as the active ingredient and a solvent fungicidal adjuvant as a carrier therefor.

4. The method of controlling fungi which comprises treating plants subject to attack by fungi with a composition comprising mucochloric anhydride as the active ingredient and a solid fungicidal adjuvant as a carrier therefor.

5. The method of controlling fungi which comprises treating plants subject to attack by fungi with a composition comprising mucochloric anhydride as the active ingredient dispersed in water.

References Cited in the file of this patent

UNITED STATES PATENTS

| | | |
|---|---|---|
| 2,226,183 | Stand et al. | Dec. 24, 1940 |
| 2,591,589 | Mowry | Apr. 1, 1952 |
| 2,628,163 | Mowry | Feb. 10, 1953 |
| 2,786,798 | Gilbert et al. | Mar. 26, 1957 |

OTHER REFERENCES

Journal of the Am. Chem. Soc., vol. 72, May–August 1950, pp. 2536–38.